(12) United States Patent
Wang

(10) Patent No.: US 6,213,137 B1
(45) Date of Patent: Apr. 10, 2001

(54) UMBRELLA OPENING DEVICE FOR VEHICLE

(76) Inventor: Tzu-Nan Wang, 6F, No. 440-2, Gin Pin Road, Chong Ho City, Taipei Hsien, 235 (TW)

( * ) Notice: Subject to any disclaimer, the term of this patent is extended or adjusted under 35 U.S.C. 154(b) by 0 days.

(21) Appl. No.: 09/488,050

(22) Filed: Jan. 20, 2000

(51) Int. Cl.[7] .............................. A45B 11/00; E04H 15/06; B60J 1/20

(52) U.S. Cl. .................. 135/20.3; 135/88.07; 135/16; 296/99.1; 296/152

(58) Field of Search .......................... 135/88.07, 88.05, 135/88.01, 20.3, 16; 296/99.1, 152

(56) References Cited

U.S. PATENT DOCUMENTS

| | | | |
|---|---|---|---|
| 4,543,971 | * 10/1985 | Sirota | 135/16 |
| 4,562,849 | * 1/1986 | Sirota | 135/16 |
| 5,318,055 | * 6/1994 | Olaniyan | 135/16 |
| 5,476,302 | * 12/1995 | Ronci | 296/99.1 |
| 5,529,368 | * 6/1996 | Cui et al. | 296/99.1 |
| 6,044,856 | * 4/2000 | Cano | 135/88.07 |

* cited by examiner

*Primary Examiner*—Robert Canfield

(57) ABSTRACT

An umbrella opening device for a vehicle includes a casing slidably received in a housing and moved inward and outward of the housing with a motor. A follower is rotatably received in the casing for supporting an an umbrella with a support. A motor is coupled to the follower for rotating the follower and the support and the umbrella to an erect position and to open the umbrella above the driver or the passenger. The casing has a rack engaged with a gear of the motor for being moved relative to the housing by the motor. A cover may be opened by the casing.

10 Claims, 9 Drawing Sheets

UMBRELLA OPENING DEVICE FOR VEHICLE

BACKGROUND OF THE INVENTION

1. Field of the Invention

The present invention relates to an umbrella opening device, and more particularly to an umbrella opening device for vehicles.

2. Description of the Prior Art

Typically, the drivers and/or the passengers of the vehicles may not easily open the umbrella and may be wetted by the rain when entering into or leaving the vehicle.

The present invention has arisen to mitigate and/or obviate the afore-described disadvantages of the conventional vehicles.

SUMMARY OF THE INVENTION

The primary objective of the present invention is to provide an umbrella opening device attached on top of the vehicle and having an umbrella that may be opened for allowing the drivers and/or the passengers to enter into or to leave the vehicle without being wetted by the rain.

In accordance with one aspect of the invention, there is provided an umbrella opening device for a vehicle comprising a housing including a channel formed therein, a casing slidably received in the channel of the housing, means for moving the casing inward and outward of the housing, a follower rotatably received in the casing, a support secured on the follower, an umbrella supported in the support, and means for rotating the follower to rotate the support and the umbrella outward of the casing.

The casing includes at least one curved slot formed therein, the follower includes at least one roller slidably received in the at least one curved slot of the casing for guiding the follower to rotate relative to the casing. The casing includes at least one pair of wheels engaged with the follower for guiding the follower to rotate relative to the casing. A covering is secured on a first end of the casing for partially shielding the umbrella.

The moving means includes a rack secured in the casing, a motor disposed in the housing and having a gear engaged with the rack for moving the rack and the casing relative to the housing. A disengaging device is further provided for disengaging the gear from the rack.

The housing includes a side portion having a roll of sun shade received therein. The housing includes another side portion having a spare umbrella received therein. A limiting device is provided for limiting the casing to move relative to the housing. A cover is pivotally secured to the housing, and means for opening the cover when the casing is moved outward of the housing.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figures 3, 4:
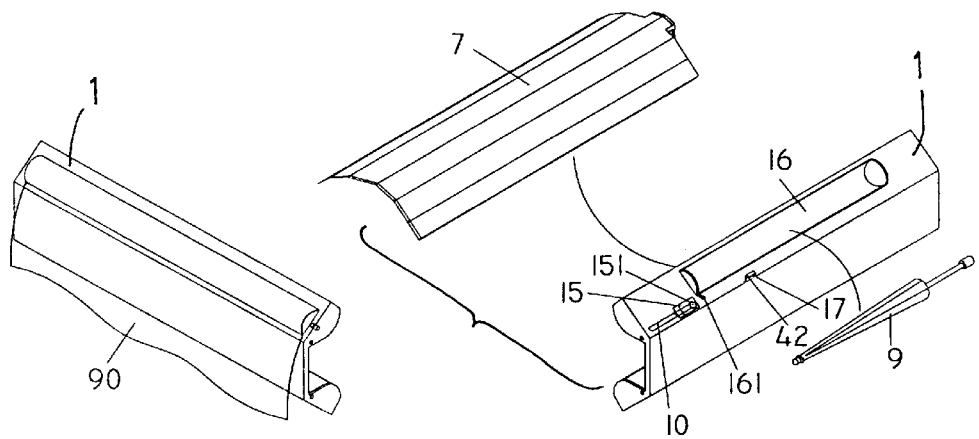
FIG. 3 is a partial perspective view of the umbrella opening device.
FIG. 4 is a partial exploded view of the umbrella opening device.
Figure 2:
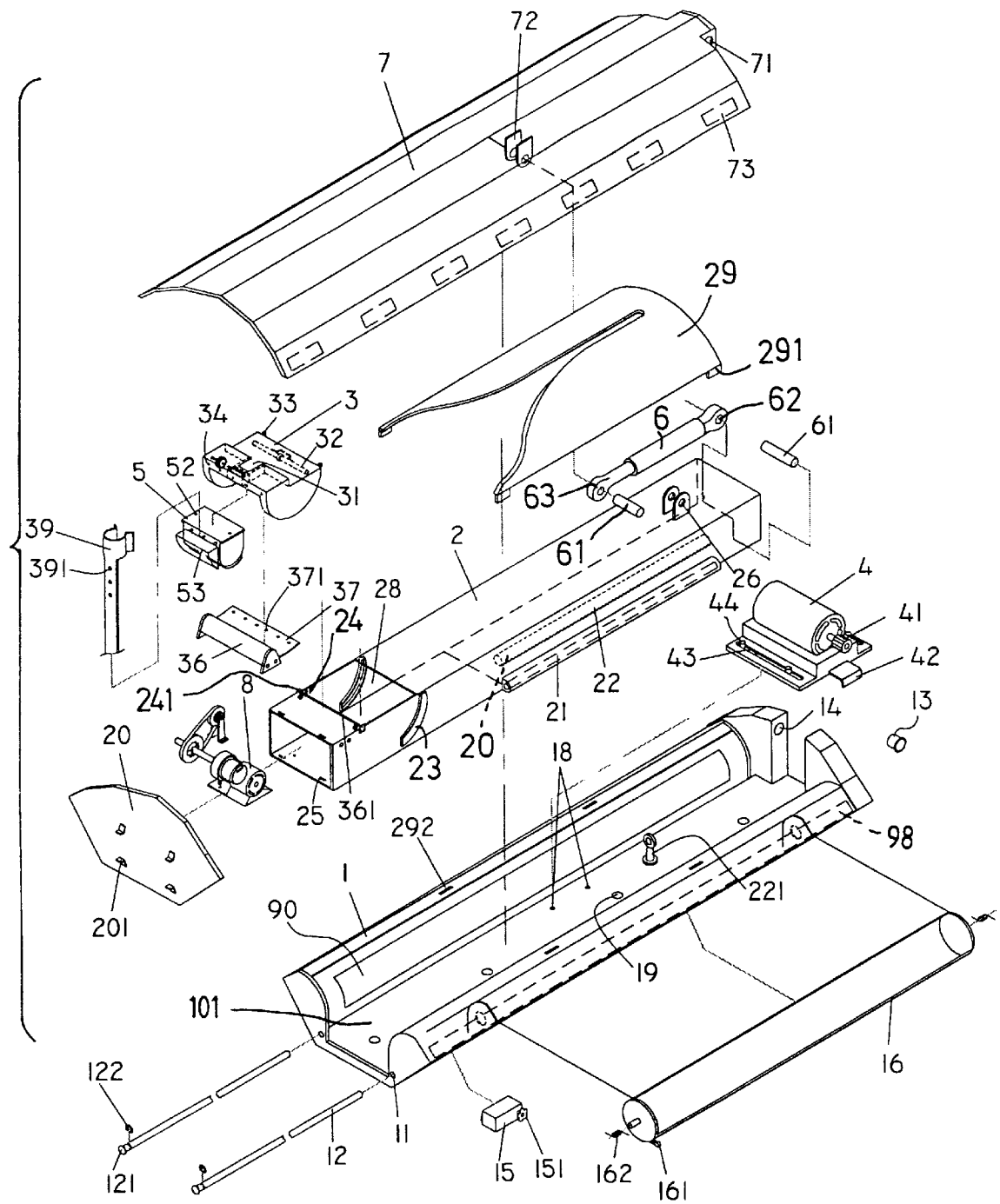
FIG. 2 is an exploded view of the umbrella opening device.

Referring to the drawings, and initially to FIGS. 1–5, an umbrella opening device in accordance with the present invention comprises a housing 1 secured on top of a vehicle with fasteners, for example, and preferably secured on the front portion of the top of the vehicle. The housing 1 includes a roll of sun shade 90 (FIG. 3) received in the front portion of the housing 1 and retractable for shielding the windshield of the vehicle. A barrel 16 is rotatably received in the other side of the housing 1 for receiving a spare umbrella 9 (FIG. 4). One or more springs 162 (FIG. 2) may bias and rotate the barrel 16 for more than 90 degrees for retaining the umbrella 9 within the barrel 16. The barrel 16 includes a knob 161 for rotating the barrel 16 against the spring 162 and for engaging or for removing the umbrella 8 from the barrel 16. The housing 1 includes a channel 101 formed therein for slidably receiving a casing 2 therein. The housing 1 includes one or more water draining holes 19 formed therein, and includes one or more apertures 11 formed therein each for receiving a rod 12 which includes a head 121 engaged with the housing 1 and which is secured to the housing 1 with a clamping ring 122.

The casing 2 includes a pair of hubs 21 provided on the side portion and slidably engaged on the rods 12 for guiding the casing 2 to move along the channel 101 and the rods 12 of the housing 1. The housing 1 includes a groove 10 (FIG. 4) formed in one side portion for slidably receiving a stop 15 which may be slided along the groove 10 of the housing 1 and which may be secured to the housing 1 at the suitable position by a fastener 151. The stop 15 may be adjusted relative to the housing 1 and may be engaged with the casing 2 for limiting the outward movement of the casing 2 relative to the housing 1. A motor 4 includes a base having one or more slots 43 formed therein for receiving fasteners 44 which may engage with the screw holes 18 of the housing 1 for adjustably securing the motor 4 in the housing 1. The motor 4 includes an extension 42 extended outward through a slit 17 of the housing 1 (FIG. 4), and includes a gear 41 provided thereon.

Figure 5:
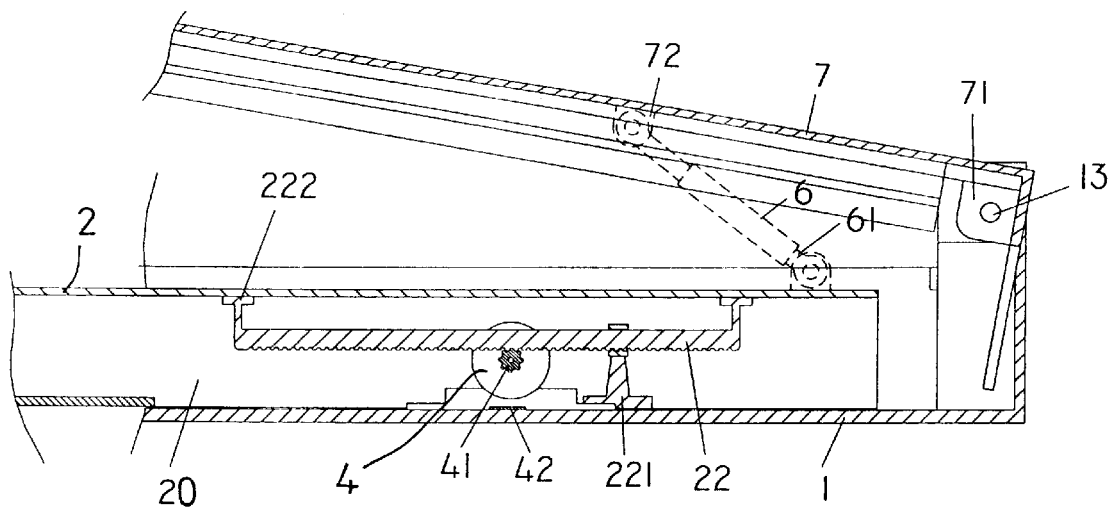
FIG. 5 is a cross sectional view taken along lines 5—5 of FIG. 1.
Figure 6:
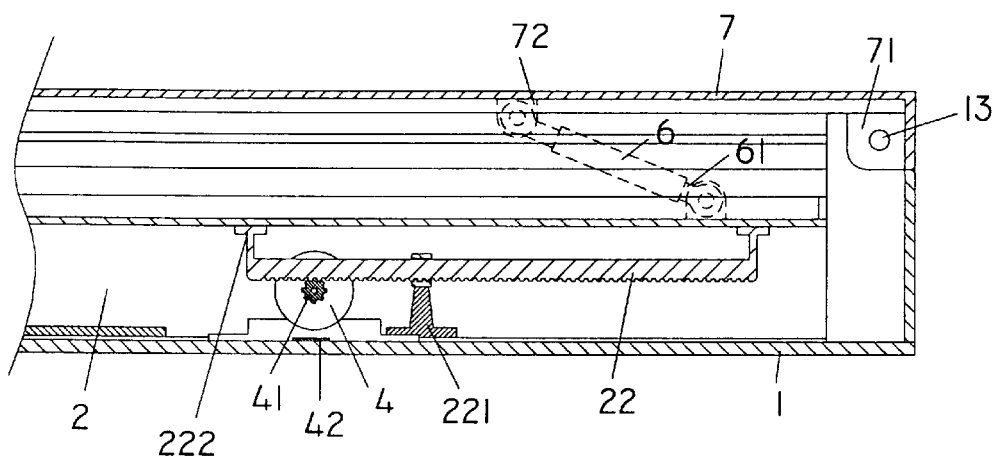
FIG. 6 is a cross sectional view similar to FIG. 5, illustrating the operation of the umbrella opening device.

The casing 2 includes a rack 22 secured therein with brackets 222 (FIGS. 5, 6) and slidably supported in the housing 1 with a holder 221. The gear 41 of the motor 4 is engaged with the rack 22 for moving the casing 2 inward and outward of the housing 1. The: extension 42 of the motor 4 may be moved inward of the housing 1 to disengage the gear 41 from the rack 22 when required. One or more springs may bias the gear 41 to engage with the rack 22. A covering 29 has one or more projections 291 extended downward therefrom and engaged into the holes 292 (FIG. 2) of the housing 1 for securing the covering 29 on one end of the housing 1. A cover 7 has one end 71 pivotally secured to one end 14 of the housing 1 with one or more pivot pins 13 and includes one or more magnetic members 73 provided thereon for acting with the magnetic members 98 disposed on top of the housing 1 and for attracting and retaining the cover 7 onto the housing 1. A link or an actuator 6 has one end 62 pivotally secured to the casing 2 with a pivot rod 61 and the other end 63 pivotally secured to the middle portion 72 of the cover 7 with another pivot rod 61. The cover 7 may be opened by the casing 2 when the casing 2 is moved outward of the housing 1 (FIG. 5). The casing 2 includes a pair of curved slots 23 formed in one end thereof and includes one or more holes 25 formed in the one end thereof. A cap 20 includes one or more hooks 201 engaged into the holes 25 of the casing 2 for securing the cap 20 to the casing 2.

Figure 8:
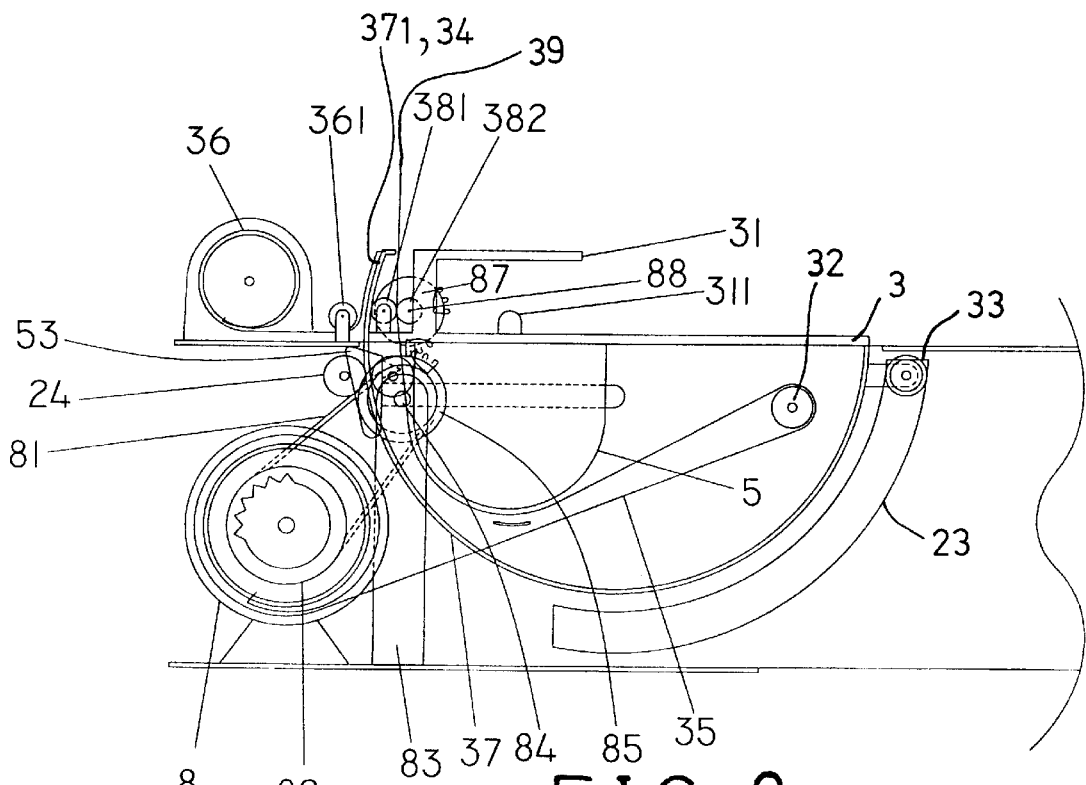

A container 36 is secured on the casing 2 and includes a spring-biased strap or blade 37 received therein and engaged around a wheel 361 of the like. A follower 3 is rotatably received in a cavity 28 of the casing 2 and includes one or more rollers 33 provided thereon and slidably engaged in the curved slots 23 of the casing 2 for guiding the follower 3 to rotate relative to the casing 2. One or more rollers or wheels 24, 241 may further be provided and engaged with the follower 3 for facilitating the rotational movement of the follower 3 relative to the casing 2. The blade 37 has one end 371 secured to one end 34 of the follower 3 (FIG. 8) for rotating the follower 3 to a downward position as shown in FIG. 8. A block 5 is secured in the follower 3 with fasteners which may engage through the holes 52 of the block 5. The follower 3 includes a pole 32 provided therein and includes a seat 31 provided thereon for securing a support 39 for an umbrella 9.

Figure 7:
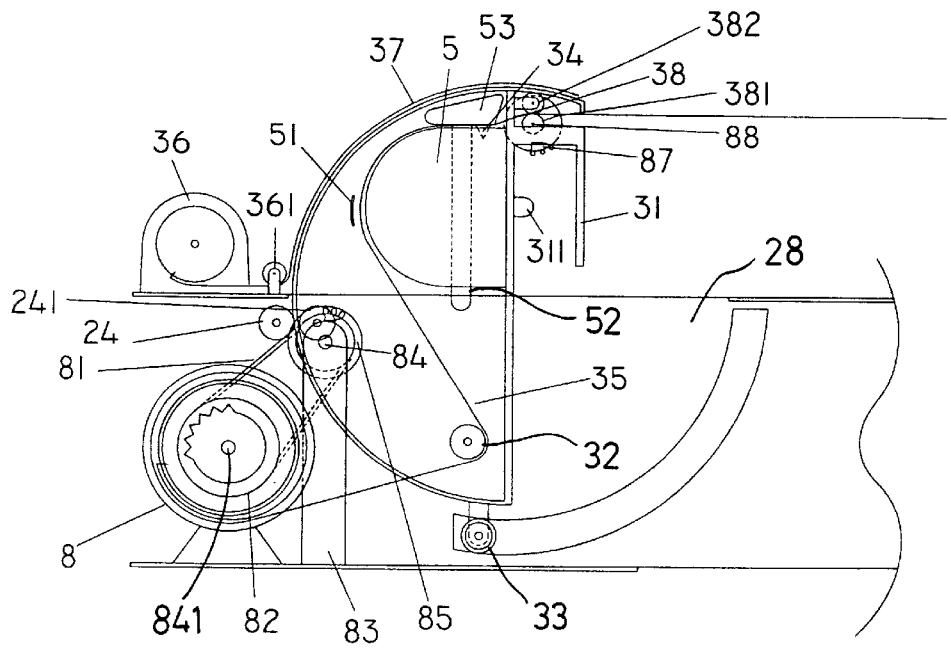
FIGS. 7 and 8 are schematic views illustrating the operation of the driving device of the umbrella opening device.
Figure 9:
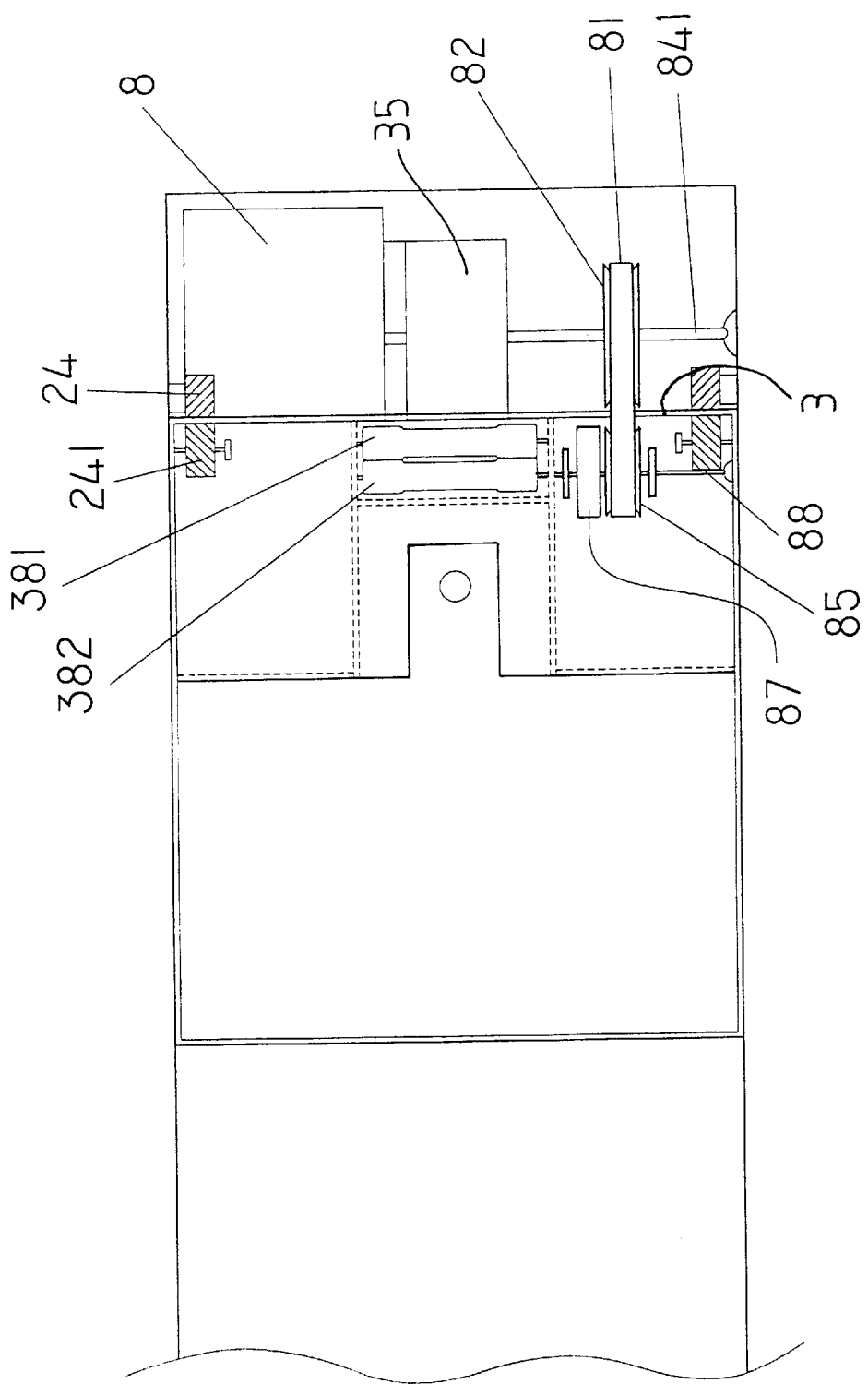
FIG. 9 is a partial top view illustrating the driving device of the umbrella opening device.

Referring next to FIGS. 7–9, a sprocket or a wheel 87 is rotatably secured in the follower 3 at a shaft 88. Another sprocket or wheel 85 is supported on a post 83 at an axle 84 and coupled to the motor 8 with another pulley or wheel 82. A roll of strap or blade 35 is secured on the axle 841 of the motor 8 and driven by the motor 8, and is engaged over the pole 32 of the follower 3 and engaged through a retainer 51 (FIG. 7) of the block 5 and engaged through a pair of rollers 381, 382 and secured to and to be engaged around one of the rollers 381, 382. A fastener 53 may secure the free end of the blade 35 to the block 5. The wheel 85 may engage with the follower 3 and may be rotated by the motor 8 in order to rotate the follower 3 from the downward position as shown in FIG. 8 to the erect position as shown in FIG. 7, against the spring biasing force of the spring blade 37. When the motor 8 is released or is rotated in the reverse direction, the blade 35 may be rotated and retracted by the motor 8 to rotate the follower 3 to the downward position as shown in FIG. 8 and/or the blade 37 may rotate the follower 3 to the downward position.

Figure 1:
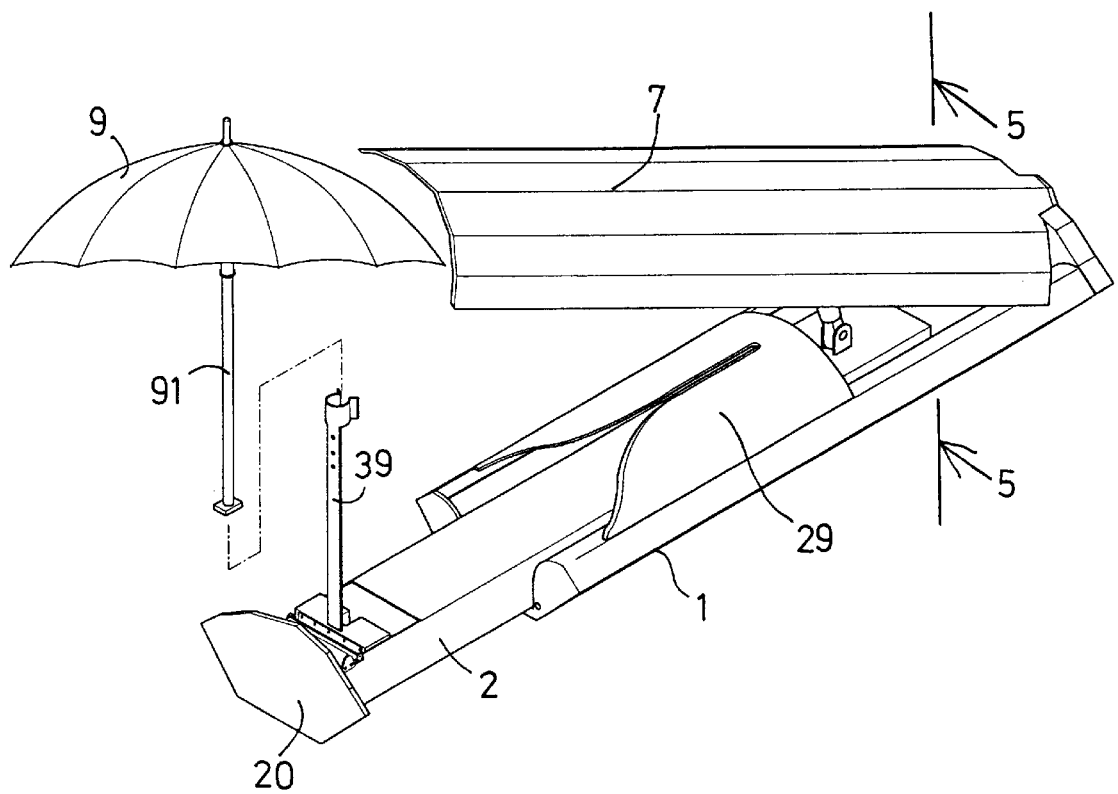
FIG. 1 is a perspective view of of an umbrella opening device in accordance with the present invention.
Figure 10:
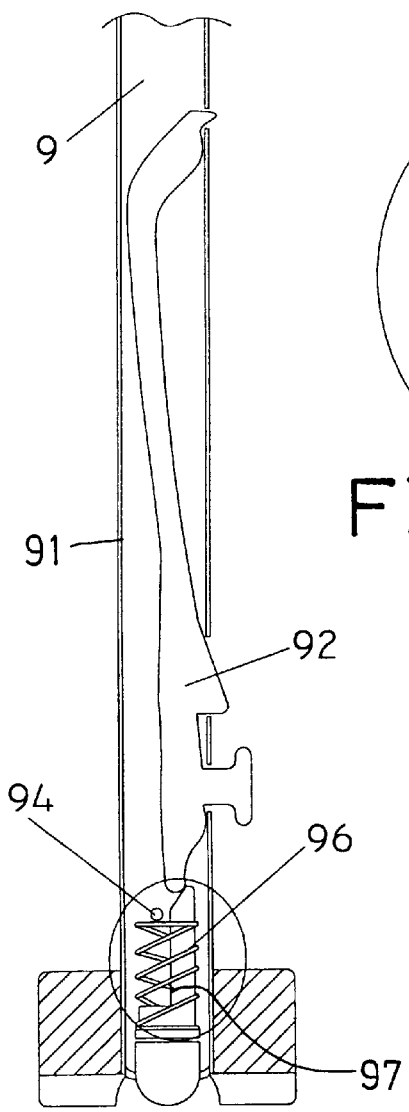
FIG. 10 is a partial cross sectional view of the stem portion of the umbrella.
Figure 11:
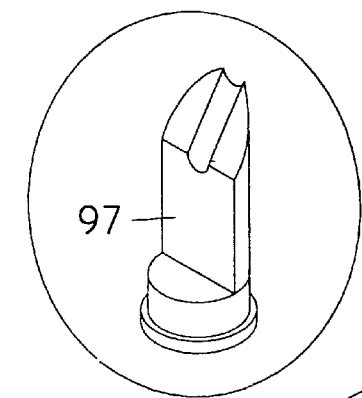
FIGS. 11 and 12 are perspective views showing the elements of the umbrella.
Figure 12:
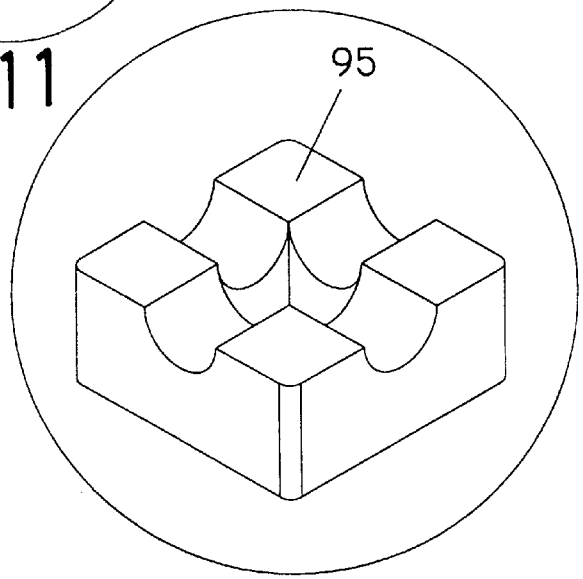

Referring next to FIGS. 10–12, the stem 91 of the umbrella 9 includes a base 95 secured to the bottom thereof, an actuator 92 received therein, a button 97 slidably engaged in the base 95, a spring 96 engaged with a pin 94 of the stem 91 and engaged with the button 97 for biasing the button 97 from the actuator 92. The seat 31 of the follower 3 includes a projection 311 (FIGS. 7, 8) for engaging with the button 97 to open the umbrella 9 when the follower 3 is rotated to the downward position as shown in FIG. 8 and when the support 39 is erected to the upward position as shown in FIG. 1.

Figure 13:
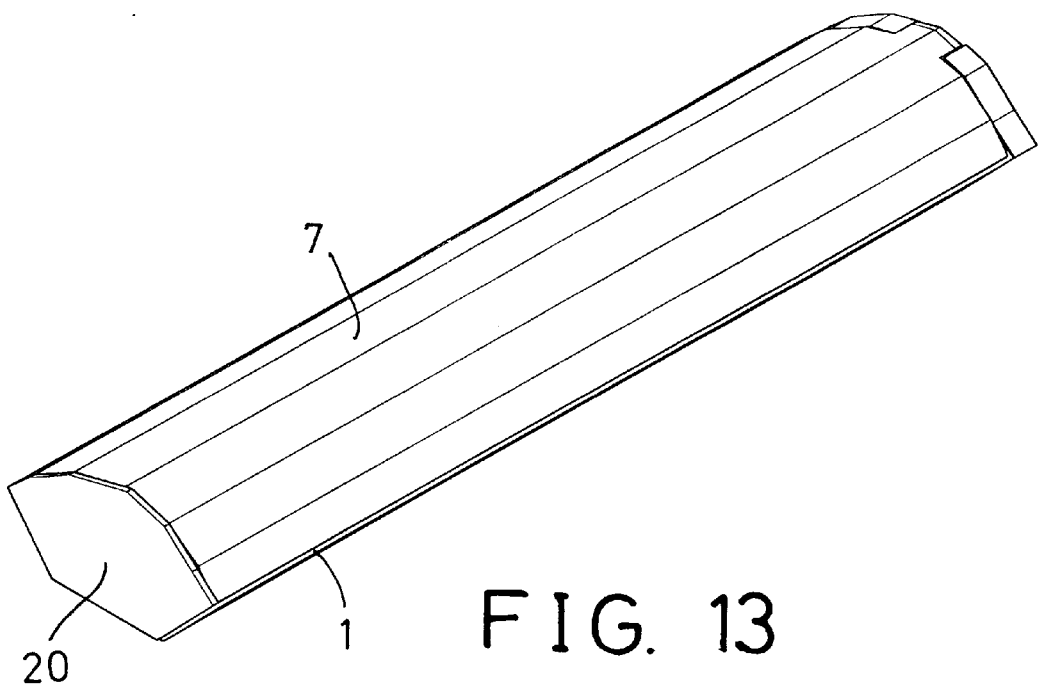
FIGS. 13, 14, 15, 16, 17 are perspective views illustrating the operation of the umbrella opening device.
Figure 15:
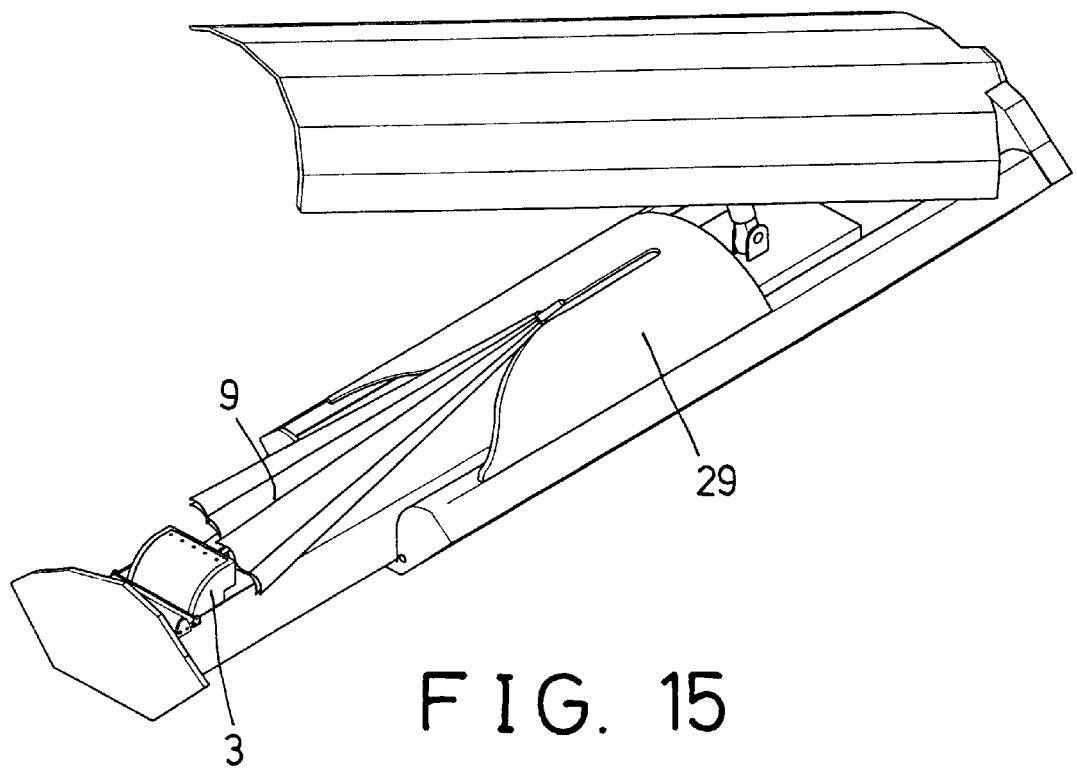
Figure 14:
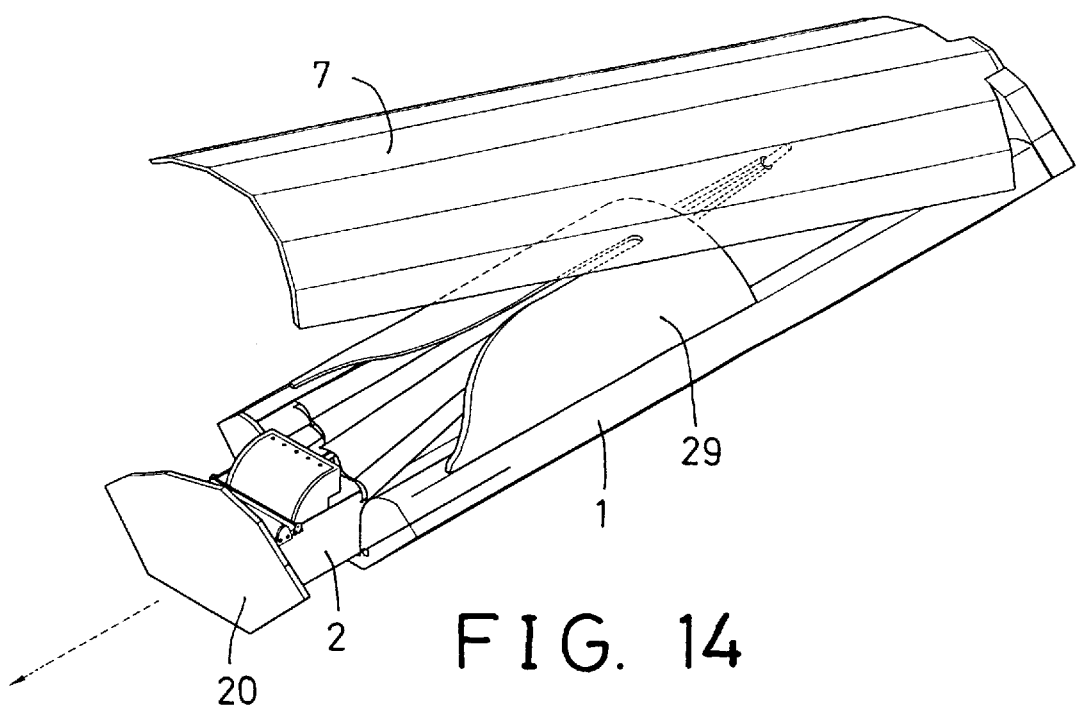
Figure 16:
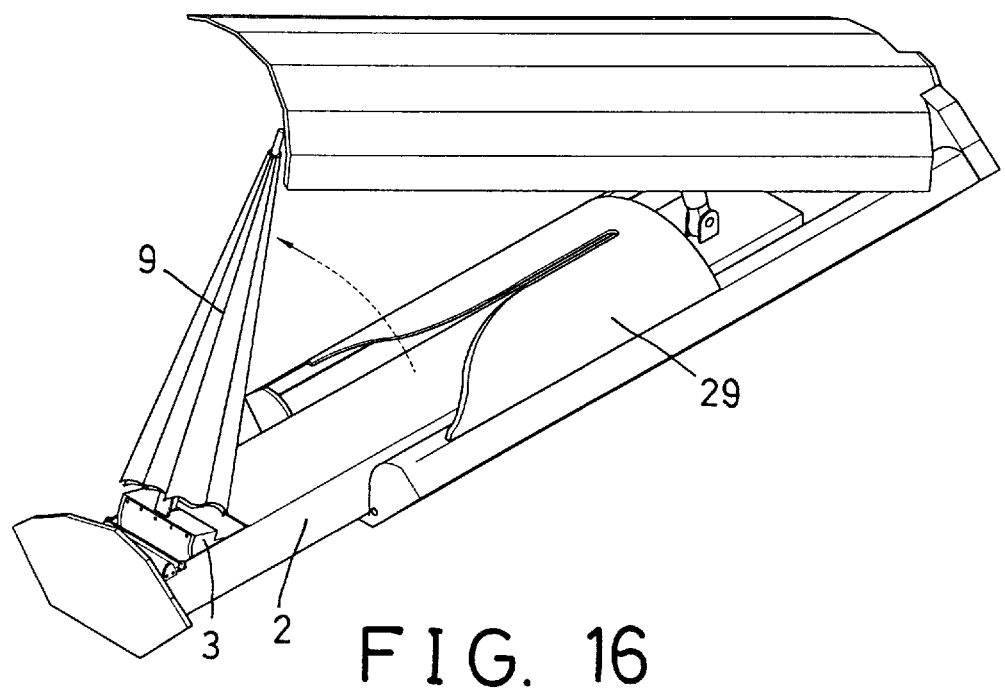
Figure 17:
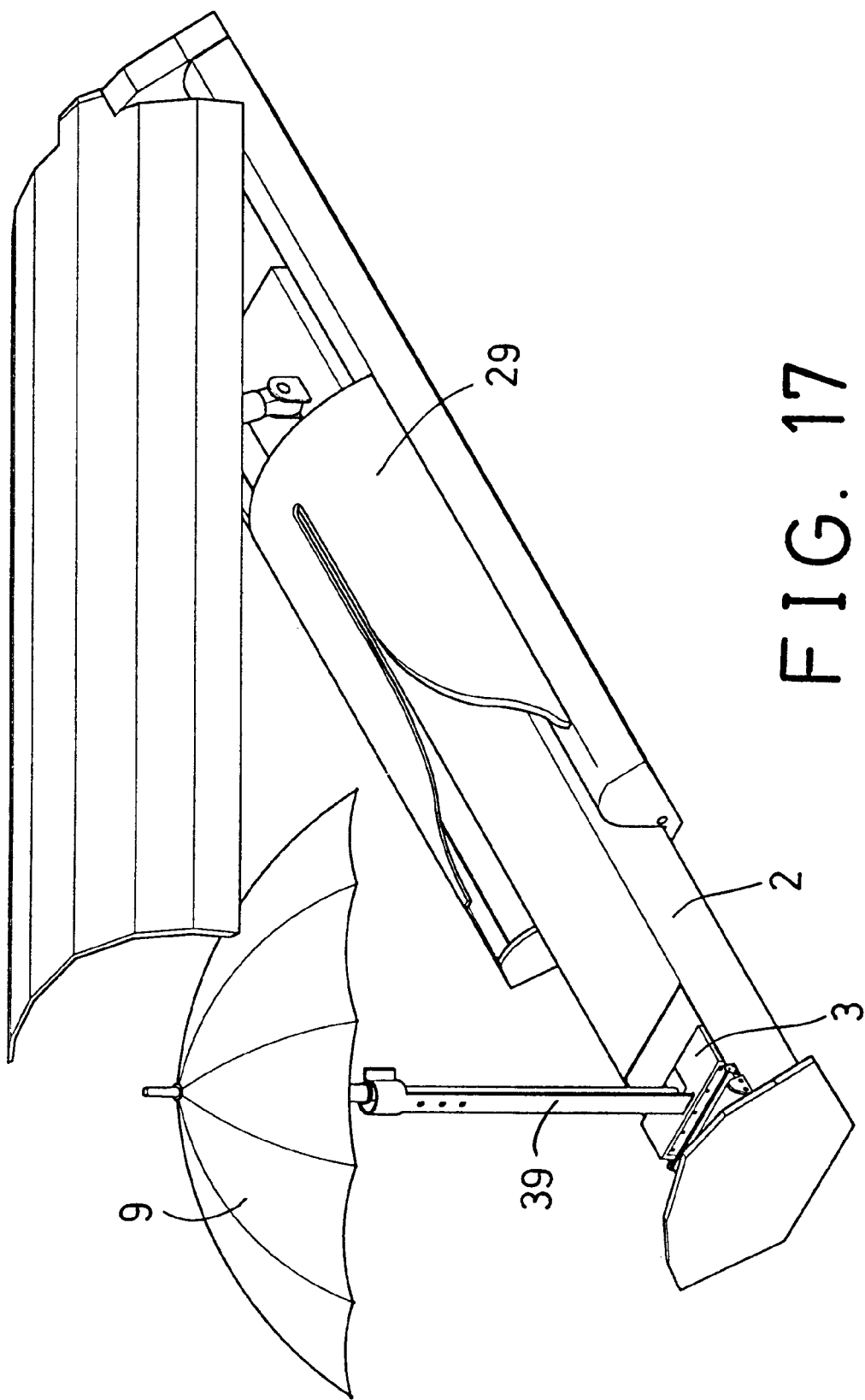

In operation, as shown in FIG. 13, the umbrella 9 may be received in the casing 2 and the housing 1 and covered by the cover 7. When the motor 4 is energized to move the casing 2 outward of the housing 1, the cover 7 may be opened (FIG. 14). As shown in FIGS. 15, 16, when the umbrella 9 leaves the covering 29, the motor 8 may rotate the follower 3 to erect the support 39 and the umbrella 9, and the projection 311 (FIGS. 7, 8) may actuate the button 97 to open the umbrella 9 (FIG. 17). When the umbrella 9 is opened, the umbrella 9 is arranged and located above the door of the vehicle for shielding the drivers and/or the passengers and for preventing the driver and/or the passengers from being wetted by the rain when entering into or leaving the vehicle.

Accordingly, the umbrella opening device in accordance with the present invention is attached on top of the vehicle and includes an umbrella that may be opened for allowing the drivers and/or the passengers to enter into or to leave the vehicle without being wetted by the rain.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An umbrella opening device for a vehicle comprising:
   a housing including a channel formed therein,
   a casing slidably received in said channel of said housing,
   means for moving said casing inward and outward of said housing,
   a follower rotatably received in said casing,
   a support secured on said follower,
   an umbrella supported in said support, and
   means for rotating said follower to rotate said support and said umbrella outward of said casing.

2. The umbrella opening device according to claim 1, wherein said casing includes at least one curved slot formed therein, said follower includes at least one roller slidably received in said at least one curved slot of said casing for guiding said follower to rotate relative to said casing.

3. The umbrella opening device according to claim 1, wherein said casing includes at least one pair of wheels engaged with said follower for guiding said follower to rotate relative to said casing.

4. The umbrella opening device according to claim 1 further comprising a covering secured on a first end of said casing for partially shielding said umbrella.

5. The umbrella opening device according to claim 1, wherein said moving means includes a rack secured in said casing, a motor disposed in said housing and having a gear engaged with said rack for moving said rack and said casing relative to said housing.

6. The umbrella opening device according to claim 5 further comprising means for disengaging said gear from said rack.

7. The umbrella opening device according to claim 1, wherein said housing includes a side portion having a roll of sun shade received therein.

8. The umbrella opening device according to claim 1, wherein said housing includes a side portion having a spare umbrella received therein.

9. The umbrella opening device according to claim 1 further comprising means for limiting said casing to move relative to said housing.

10. The umbrella opening device according to claim 1 further comprising a cover pivotally secured to said housing, and means for opening said cover when said casing is moved outward of said housing.

* * * * *